United States Patent
Sato et al.

(10) Patent No.: US 9,376,272 B2
(45) Date of Patent: Jun. 28, 2016

(54) POWDER SUPPLY DEVICE

(71) Applicant: TOYOTA JIDOSHA KABUSHIKI KAISHA, Toyota-shi, Aichi (JP)

(72) Inventors: Akio Sato, Toyota (JP); Kenji Kidera, Toyota (JP); Norikazu Kume, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/575,747

(22) Filed: Dec. 18, 2014

(65) Prior Publication Data
US 2015/0191316 A1    Jul. 9, 2015

(30) Foreign Application Priority Data

Jan. 7, 2014  (JP) .................................. 2014-001053

(51) Int. Cl.
| | |
|---|---|
| *B65G 53/66* | (2006.01) |
| *B65G 53/10* | (2006.01) |
| *B23K 26/00* | (2014.01) |

(52) U.S. Cl.
CPC ............. *B65G 53/10* (2013.01); *B23K 26/00* (2013.01)

(58) Field of Classification Search
USPC ........................ 406/50, 83, 85, 124, 144, 157
See application file for complete search history.

(56) References Cited

U.S. PATENT DOCUMENTS

| | | | | |
|---|---|---|---|---|
| 1,597,438 | A * | 8/1926 | Ford ............................. | 406/156 |
| 1,669,084 | A * | 5/1928 | Grindle ......................... | 406/23 |
| 3,297,366 | A * | 1/1967 | Kauffman ................ | B22C 5/12 |
| | | | | 406/124 |
| 3,708,208 | A * | 1/1973 | Fuss ............................. | 406/144 |
| 6,244,788 | B1 * | 6/2001 | Hernandez ........... | B23K 3/0623 |
| | | | | 406/109 |
| 8,113,745 | B2 * | 2/2012 | Aoki ............................ | 406/197 |
| 8,348,556 | B2 * | 1/2013 | Hilgraf ..................... | F23K 3/02 |
| | | | | 110/105 |
| 8,905,681 | B2 * | 12/2014 | Schneider et al. ........... | 406/156 |

FOREIGN PATENT DOCUMENTS

| | | |
|---|---|---|
| JP | S62-144541 U | 9/1987 |
| JP | H06-345263 A | 12/1994 |
| JP | A-10-278902 | 10/1998 |
| JP | A-2003-302281 | 10/2003 |

* cited by examiner

*Primary Examiner* — Joseph Dillon, Jr.
(74) *Attorney, Agent, or Firm* — Oliff PLC

(57) ABSTRACT

Provided is a powder supply device that can stably supply powder from a main hopper to a powder supply means including a sub-hopper without requiring component replacement and the like. The powder supply device is provided with: a first piping that guides powder accumulated in a main hopper downward; a second piping that is connected to the first piping at a lower end portion thereof while intersecting with the first piping, and that guides the powder guided by the first piping to a sub-hopper; and a switching valve that pressure-feeds the powder temporarily deposited while forming an angle of repose at an intersecting portion of the first piping and the second piping, to the sub-hopper.

5 Claims, 3 Drawing Sheets

POWDER SUPPLY DEVICE

BACKGROUND

1. Technical Field

The present invention relates to powder supply devices, and particularly to a powder supply device for supplying a powder, such as powder metal and the like, used for laser cladding processing, for example.

2. Background Art

Conventionally, laser processing is known whereby, e.g., in order to increase the durability of the valve seat of an engine cylinder head while increasing its design freedom, the valve seat is irradiated with laser while a powder (powdered) overlay material, for example, is supplied, forming an overlay layer (cladding layer) as the valve seat and the laser are relatively rotated. This laser processing is a technology where the cylinder head that has been subjected to machining processing required for an engine combustion chamber, such as valve opening forming processing, is irradiated with laser while the powdered overlay material including a copper alloy and the like and having abrasion resistance is supplied to an area where the valve seat is to be formed, forming a ring-shaped overlay layer, namely an overlay head portion, that is to eventually provide the valve seat. Generally, the technology is referred to as laser cladding processing.

The quality of the product subjected to the laser cladding processing depends on the amount of supply of the overlay material to the nozzle during the laser cladding processing. Thus, in the relevant field, there is a need for highly accurately adjusting the amount of supply of the overlay material (powder).

In order to address such need, Patent Document 1 discloses a powder supply device that is capable of continuous operation while highly accurately controlling the amount of supply of powder, and that increases the ease of use in various use environments.

The powder supply device disclosed in Patent Document 1 includes a powder supply means provided with a sub-hopper with capacity equal to or greater than the amount of supply required in a unit of processing step; a powder route to the powder supply means including a series of a main hopper and a powder replenishing means, the main hopper having capacity equal to or greater than the amount of supply required throughout the entire steps; and a control means that causes the powder supply means to operate based on the amount of powder held in the powder supply means, and that causes the powder replenishing means to operate in accordance with the amount of powder held in the powder supply means and a operation state thereof.

RELATED ART DOCUMENT

Patent Document

Patent Document 1: JP 10-278902 A

SUMMARY

According to the powder supply device disclosed in Patent Document 1, the powder supply means is replenished with the powder by the powder replenishing means, of which the operation is controlled by the control means, while the amount of supply of powder is highly accurately measured. Thus, the powder supply device can be continuously operated while the amount of supply of powder is highly accurately controlled.

However, in the powder supply device disclosed in Patent Document 1, the powder replenishing means (replenishing valve) for controlling the amount of replenishment of powder to the powder supply means including the sub-hopper is disposed adjacent to the main hopper a substantially vertical direction, with the replenish valve contacting the powder. Thus, there may be caused the problem of variations in the amount of supply of powder due to changes in performance of the replenish valve over time caused by, the seizure of the powder on the replenish valve. The replenish valve may also need to be replaced at regular intervals.

The present invention was made in view of the above problems, and an object of the invention is to provide a powder supply device capable of stably supplying powder from a main hopper to a powder supply means provided with a sub-hopper, without requiring the replacement of components, for example.

In order to achieve the object, the present invention provides a powder supply device that supplies powder accumulated in a first hopper to a second hopper, the device including a first piping that guides the powder accumulated in the first hopper downward; a second piping that is connected to the first piping at a lower end portion thereof while intersecting with the first piping, and that guides the powder guided by the first piping to the second hopper; and a pressure-feeding unit that pressure-feeds the powder which is temporarily deposited while forming an angle of repose at an intersecting portion of the first piping and the second piping, to the second hopper.

In the powder supply device according to the above aspect, the powder deposited while forming an angle of repose at the intersecting portion of the first piping, guiding the powder accumulated in the first hopper downward, and the second piping connected to the first piping while intersecting therewith is pressure-fed to the second hopper using a carrier gas such as nitrogen gas, whereby the contact between the powder guided downward from the first hopper using gravity and the pressure-feeding unit for pressure-feeding the powder to the second hopper can be reliably avoided. Thus, the powder can be stably supplied from the first hopper to the second hopper for a tong period without requiring component replacement or the like in the pressure-feeding unit.

Preferably, the second piping may be extended along a horizontal direction, and the first piping may be extended along a vertical direction.

In the powder supply device according to the above aspect, the powder accumulated in the first hopper can be guided downward and deposited while forming an angle of repose at the intersecting portion of the first piping and the second piping in a simple configuration. Thus, the device configuration of the powder supply device can be greatly simplified.

Preferably, the second piping may include a curved portion protruding downward at the intersecting portion.

In the powder supply device according to the above aspect, the powder can be reliably deposited while forming an angle of repose at the intersecting portion of the first piping and the second piping, while the amount of supply of the powder that is pressure-fed to the second hopper by the pressure-feeding unit can be precisely controlled.

In another preferable aspect of the powder supply device, the second piping includes a bend portion bent downward, the bend portion being in communication with the second hopper.

In the powder supply device according to the above aspect, the powder pressure-fed from the intersecting portion of the first piping and the second piping by the pressure-feeding unit can be reliably introduced into the second hopper. Thus, the amount of supply of the powder pressure-fed to the second hopper can be precisely controlled.

As will be appreciated from the foregoing description, in the powder supply device according to the present invention, the powder accumulated in the first hopper is guided downward via the first piping, and the powder deposited while forming an angle of repose at the intersecting portion of the first piping and the second piping is pressure-fed to the second hopper using carrier gas. With such simple configuration, the powder can be stably supplied from the first hopper to the second hopper without requiring component replacement and the like, for example. Thus, the quality and productivity of the product subjected to laser cladding processing can be greatly increased.

DETAILED DESCRIPTION OF THE EMBODIMENTS

In the following, embodiments of the powder supply device according to the present invention will be described with reference to the drawings.

First Embodiment

Figure 1:
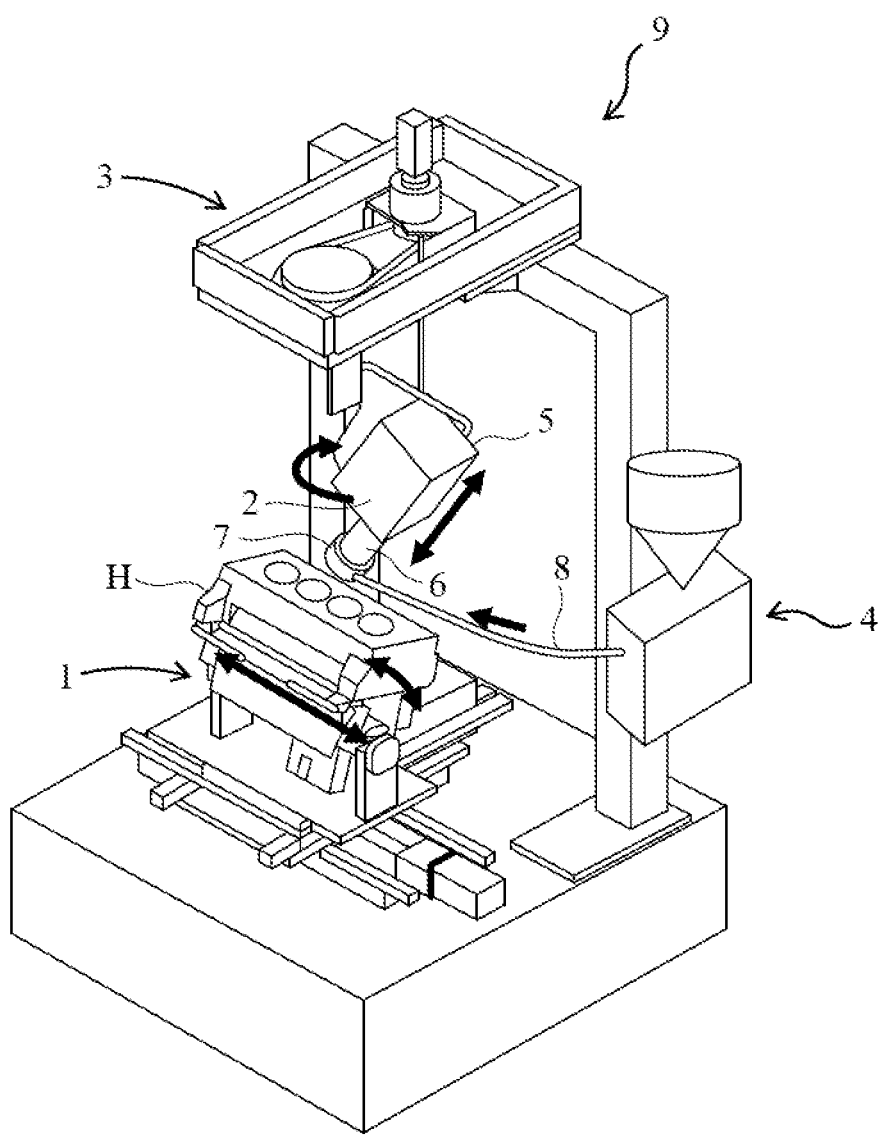
FIG. 1 is a perspective view schematically illustrating main elements of a laser cladding processing device to which a first embodiment of the powder supply device according to the present invention is applied.

FIG. 1 is a perspective view schematically illustrating main elements of a laser cladding processing device 9 to which a first embodiment of the powder supply device according, to the present invention is applied.

The laser cladding processing device 9 is a device for performing laser cladding processing on a valve seat portion of a cylinder head H, for example, and includes a cylinder head holder device 1 for tilting and holding the cylinder head H; a laser processing head 2 that discharges powder metal (powder) (such as a material including copper as a principal component) while irradiating a processing location with laser light; a rotation device 3 that rotates the laser processing head 2 around a vertical axis while holding the laser processing head 2 at an angle with respect to the vertical direction; and a powder supply device 4 that supplies the powder metal to the laser processing head 2.

The cylinder head holder device 1 tilts the cylinder head H so as to align the center axis of the valve seat portion with the vertical direction, or two-dimensionally moves the cylinder head H in the horizontal direction so as to align the center axis of the valve seat portion with the rotating axis of the laser processing head 2.

The laser processing head 2 includes a laser generation portion 5 that generates laser light; an optical system portion 6 in which condensing lenses for condensing the laser light and the like are contained; and a coaxial nozzle 7 of double-pipe structure via which the laser light passes and which discharges the powder metal from around the laser light. The coaxial nozzle 7 is connected to the powder supply device 4 via a supply pipe 8. In the laser cladding processing device 9, an amount of powder metal corresponding to the overlay layer (cladding layer) to be formed at the processing location is supplied from the powder supply device 4 to the coaxial nozzle 7, and the laser light with an output corresponding to the powder metal is generated by the laser generation portion 5. The powder metal (powder) is discharged while the processing location is irradiated with the laser light via the coaxial nozzle 7 so that a desired overlay layer (cladding layer) can be formed at the valve seat portion of the cylinder head H.

Figure 2:
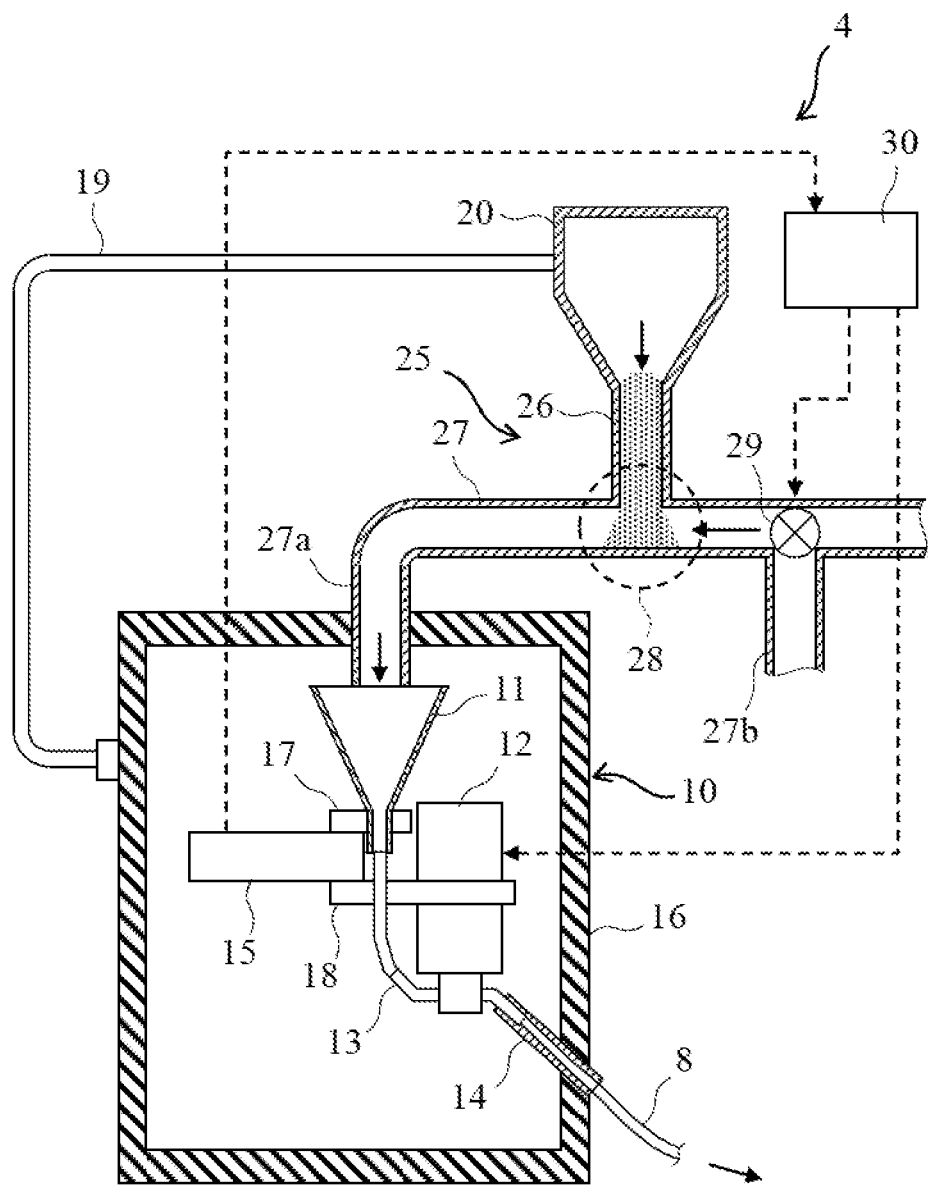
FIG. 2 is an overall configuration diagram illustrating the overall configuration of the first embodiment of the powder supply device according to the present invention.

FIG. 2 is an overall configuration diagram of the overall configuration of the powder supply device 4 (the overall configuration of the first embodiment of the powder supply device according to the present invention) illustrated in FIG. 1.

The powder supply device 4 mainly includes a powder supply unit 10 for supplying a predetermined amount of powder metal (powder) to the coaxial nozzle 7; a main hopper 20 in which the powder is accumulated for replenishing the powder supply unit 10 with powder; a guide piping 25 connecting the powder supply unit 10 and the main hopper 20; and a control device 30 that controls the operation of the powder supply device 4.

The powder supply unit 10 includes a sub-hopper 11 with a powder capacity equal to or greater than the amount of supply required in a unit of processing step; a constant quantity supply unit 12 for weighing the powder accumulated in the sub-hopper 11; a communicating pipe 13 linking the sub-hopper 11 and the constant quantity supply unit 12; a powder supply nozzle 14 for supplying the powder that has passed through the communicating pipe 13 from the sub-hopper 11 to the coaxial nozzle 7; and a mass measuring device 15, such as a load cell. These members are covered by a cover 16. The "amount of supply required in a unit of processing step" herein refers to an amount such that, when the powder supply device is used in the laser cladding processing device as according to the present embodiment, for example, all of a plurality of valve seat portions of a single cylinder bead can be provided with the powder, the amount being varied depending on the manufacturing line configuration or the item being processed. The cover 16 of the powder supply unit 10 and the main hopper 20 are connected by a bypass pipe 19 so as to decrease an internal pressure difference between the cover 16 and the main hopper 20.

A bracket 17 supporting the sub-hopper 11 and a bracket 18 supporting the constant quantity supply unit 12 are supported by the mass measuring device 15. The mass measuring device 15 measures the total mass of the sub-hopper 11, the constant quantity supply unit 12, the communicating pipe 13, and the powder, and transmits a measurement result to the control device 30. Based on the measurement result transmitted from the mass measuring device 15 the control device 30 calculates a change in mass per unit time, and controls the constant quantity supply unit 12 based on a calculation result. Thus, the powder can be delivered to the powder supply nozzle 14 while being weighed by the constant quantity supply unit 12, whereby the amount of supply of powder to the coaxial nozzle 7 can be highly accurately adjusted.

The guide piping 25 for replenishing the sub-hopper second hopper) 11 of the powder supply unit 10 with the powder from the main hopper (first hopper) 20 includes a first piping 26 guiding the powder accumulated in the main hopper 20 downward; a second piping 27 connected to the first piping 26 at the lower end portion thereof while intersecting with the first piping 26, and guiding the powder guided by the first piping 26 to the sub-hopper 11 of the powder supply unit 10; and a switching valve (pressure-feeding unit) 29 for pressure-feeding the powder temporarily deposited, forming an angle of repose, at an intersecting portion 28 between the first piping 26 and the second piping 27, to the sub-hopper 11 using a carrier gas (such as nitrogen gas).

The first piping 26 is extended substantially along the vertical direction, and the powder accumulated in the main hopper 20 is guided vertically downward due to gravity. The second piping 27 is extended substantially along the horizontal direction. The first piping 26 and the second piping 27 intersect with each other substantially at a right angle, so that the powder guided downward from the main hopper 20 is deposited at the intersecting portion 28, forming, an angle of repose. At the end of the second piping 27 closer to the sub-hopper 11 (downstream side) from the intersecting portion 28, a downwardly bent bend portion 27*a* is disposed, with the end of the bend portion 27*a* communicating with the sub-hopper 11. More specifically, because the powder is deposited while forming an angle of repose at the intersecting portion 28 of the first piping 26 and the second piping 27, the bend portion 27*a* is disposed more toward the downstream side than the ridge line of the powder deposited while forming an angle of repose at the intersecting portion 28.

The switching valve 29 is disposed on the opposite side (upstream sick) from the sub-hopper side of the second piping 27 with respect to the intersecting portion 28. To the switching valve 29, an escape pipe 27*b* for letting out unwanted carrier gas is connected. Further upstream of the switching valve 29 (the opposite side from the intersecting portion 28), a tank (not illustrated) or the like as a carrier gas supply source is connected.

The switching valve 29 is configured to be controlled to be opened or closed by the control device 30 based on the measurement result by the mass measuring device 15 or a previously stored timing (which may include a timing based on a manufacturing step, such as the end of a unit of processing step). When the valve is opened with respect to the intersecting portion 28 of the first piping 26 and the second piping 27, the powder deposited at the intersecting portion 28 while forming an angle of repose is pressure-fed by the carrier gas toward the sub-hopper 11.

More specifically, the switching valve 29 is normally opened to the escape pipe 27*b*, allowing the carrier gas provided from the tank (not illustrated) or the like to be discharged via the escape pipe 27*b*. On the other hand, when the control device 30 determines that the sub-hopper 11 of the powder supply unit 10 needs to be replenished with powder based on the measurement result transmitted from the mass measuring device 15 or the previously stored timing such as the timing based on a manufacturing step), the control device 30 transmits a control signal regarding the opening of the valve to the switching valve 29, indicating an open-valve time, an opening degree and the like. The switching valve 29, upon reception of the control signal from the control device 30, is switched to be opened toward the intersecting portion 28 of the first piping 26 and the second piping 27 for the open-valve time or at the opening degree and the like in accordance with the control signal, thus allowing the carrier gas to be delivered to the intersecting portion 28. In this way, the powder temporarily deposited while forming an angle of repose at the intersecting portion 28 of the first piping 26 and the second piping 27 is pressure-fed to the sub-hopper 11 via the bend portion 27*a*. The control device 30, upon determining that the replenishment of the sub-hopper 11 with powder is complete based on the measurement result transmitted from the mass measuring device 15 or the previously stored timing, transmits a control signal regarding the closing of the valve to the switching valve 29. As a result, the delivery of the carrier gas to the powder deposited at the intersecting portion 28 of the first piping 26 and the second piping 27 is stopped, allowing the powder to be again deposited at the intersecting portion 28, forming an angle of repose. By repeating such operation, the sub-hopper 11 of the powder supply unit 10 can be replenished, by a constant quantity and in a continuous manner, with the powder accumulated in the main hopper 20.

When the fluidity and the like of the powder is varied by the type of powder, humidity, atmospheric temperature, pressure and the like, the flow rate of the carrier gas delivered toward the powder at the intersecting, portion 28 may be adjusted by controlling the opening degree of the switching valve 29, the pressure of the carrier gas, etc., as needed. In this way, the sub-hopper 11 can be reliably replenished with a predetermined amount of powder within a specified time that may be set in advance, for example.

Thus, in the powder supply device 4 according to the first embodiment, the powder accumulated in the main hopper 20 is guided to the intersecting portion 28 of the first piping 26 and the second piping 27 via the first piping 26 extending downward from the main hopper 20. The switching valve 29 disposed on the upstream side of the intersecting portion 28 is switched at an appropriate timing so as to pressure-feed the powder deposited while forming an angle of repose at the intersecting portion 28 to the sub-hopper 11 using the carrier gas. Thus, the powder supplied from the main hopper 20 to the sub-hopper 11 only contacts the piping portion of the powder supply device 4, so that the contact between the switching valve 29 for delivering the powder to the sub-hopper 11, for example, and the powder can be reliably avoided. Accordingly, the powder can be stably supplied from the main hopper 20 to the sub-hopper 11 for a long period without requiring component replacement and the like in the switching valve 29, for example. In this way, the quality of the product subjected to laser cladding processing, for example, can be increased, while eliminating the need for repair or the like of the product, significantly increasing the productivity of the product.

Second Embodiment

Figure 3:
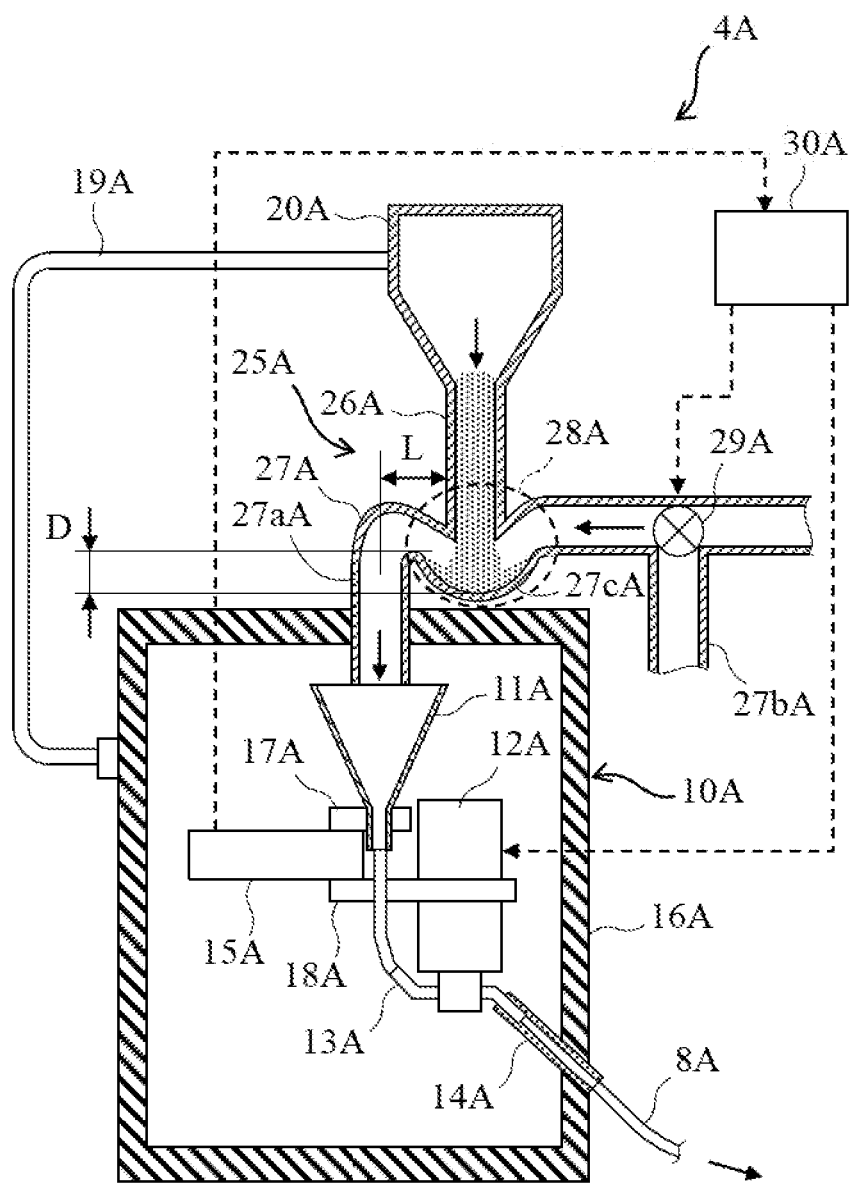
FIG. 3 is an overall configuration diagram illustrating the overall configuration of a second embodiment of the powder supply device according to the present invention.

FIG. 3 is an overall configuration diagram illustrating the overall configuration of the powder supply device according to a second embodiment of the present invention. The powder supply device according to the second embodiment illustrated in FIG. 3 differs from the powder supply device of the first embodiment illustrated in FIG. 2 mainly in the configuration of the intersecting portion of the first piping and the second piping, and is similar to the powder supply device of the first embodiment in other elements. Thus, the elements similar to those of the first embodiment will be designated with similar signs and their detailed description will be omitted.

In a powder supply device 4A illustrated in FIG. 3, a second piping 27A includes a curved portion 27*c*A protruding downward at an intersecting portion 28A of a first piping 26A and the second piping 27A.

Because of the curved portion 27*c*A protruding downward at the intersecting portion 28A as described above, the powder guided downward via the first piping 26A from a main hopper 20A can be easily deposited, forming an angle of repose, at the curved portion 27*c*A of the intersecting portion 28A. Further, when the powder deposited while forming an angle of repose at the curved portion 27*c*A of the intersecting portion 28A is pressure-fed to a sub-hopper 11A by switching the switching valve 29 disposed on the upstream side of the intersecting portion 28A, and then the delivery of the carrier gas to the powder is stopped by switching the switching valve 29, the powder remaining on the downstream side from the intersecting portion 28A of the second piping 27A can be led to the curved portion 27cA of the intersecting portion 28A and deposited therein.

Thus, in the powder supply device 4A according to the second embodiment, the powder guided downward from the main hopper 20A via the first piping 26A and the powder that remains in the second piping 27A after pressure-feeding to the sub-hopper 11A can be led to the curved portion 27cA of the intersecting portion 28A and deposited therein. Accordingly, the powder can be easily deposited while forming an angle of repose in the curved portion 27cA of the intersecting portion 28A, whereby the amount of supply of powder that is pressure-fed to the sub-hopper 11A can be precisely controlled. Further, the piping length L from the first piping 26A to the bend portion 27aA of the second piping 27A can be decreased, whereby the physical size of the powder supply device 4A as a whole can be decreased.

It has been confirmed by the present inventors that a preferable depth D of the curved portion 27cA with respect to the horizontal portion of the second piping 27A is approximately one half the diameter of the second piping 27A.

The first and the second embodiments have been described mainly with reference to the aspect in which powder metal used for laser cladding processing is supplied from the main hopper to the sub-hopper. However, any powder may be applied as long as the powder can be deposited while forming an angle of repose at the intersecting portion in the guide piping.

The first and the second embodiments have been described with reference to the aspect in which the first piping connected to the main hopper is extended substantially along the vertical direction. However, the first piping may be inclined with respect to the vertical direction, or provided with a bend portion or a curved portion (a curved-line portion), as long as the piping can guide the powder from the main hopper to the portion intersecting with the second piping using gravity. Further, the first and the second embodiments have been described with reference to the aspect in which most of the second piping connected to the sub-hopper is extended substantially along the horizontal direction. However, the second piping may be inclined with respect to the horizontal direction or provided with a bend portion or a curved portion or the like, as long as the powder can be deposited while forming an angle of repose at the portion intersecting with the first piping. The first and the second embodiments have been described with reference to the aspect in which the bend portion of the second piping connected to the sub-hopper is extended substantially along the vertical direction. However, the bend portion may be inclined with respect to the vertical direction or provided with a bend portion or a curved portion, as long as the powder can be guided to the sub-hopper using gravity.

The first and the second embodiments have been described with reference to the aspect in which the carrier gas is discharged to the outside via the escape pipe during normal time. However, the escape pipe may be omitted and the carrier gas may be blocked during normal time so as to simplify device configuration.

While the embodiments of the present invention have been described with reference to the drawings, a specific configuration of the present invention is not limited to the embodiments. Design modifications and the like may be made without departing from the gist of the present invention, and such modifications are included in the present invention.

DESCRIPTION OF SYMBOLS

1 Cylinder head holder device
2 Laser processing head
3 Rotation device
4 Powder supply device
5 Laser generation portion
6 Optical system portion
7 Coaxial nozzle
8 Supply pipe
9 Laser Cladding processing device
10 Powder supply unit
11 Sub-hopper (Second hopper)
12 Constant quantity supply unit
13 Communicating pipe
14 Powder supply nozzle
15 Mass measuring device
16 Cover
20 Main hopper (first hopper)
25 Guide piping
26 First piping
27 Second piping
27a. Bend portion
28 Intersecting portion
29 Switching valve (pressure-feeding unit)
30 Control device

What is claimed is:

1. A powder supply device that supplies powder accumulated in a first hopper to a second hopper,
   the device comprising:
   a first piping that guides the powder accumulated in the first hopper downward in a vertical direction of the powder supply device;
   a second piping that is connected to the first piping at a lower end portion thereof while intersecting with the first piping, and that guides the powder guided by the first piping to the second hopper; and
   a switching valve for switching a supply of a carrier gas that pressure-feeds the powder which is temporarily deposited while forming an angle of repose at an intersecting portion of the first piping and the second piping, the switching valve being disposed in the second piping and on an upstream side of the intersecting portion of the first piping and the second piping,
   wherein the second piping includes a bend portion bent downward, a lower end of the bend portion being connected to an upper portion of the second hopper such that an entirety of the second hopper is disposed below the second piping in the vertical direction of the powder supply device.

2. The powder supply device according to claim 1, wherein the second piping is extended along a horizontal direction.

3. The powder supply device according to claim 1, wherein the first piping is extended along the vertical direction.

4. The powder supply device according to claim 1, wherein the second piping includes a curved portion protruding downward at the intersecting portion.

5. The powder supply device according to claim 2, wherein the first piping is extended along the vertical direction.

* * * * *